July 21, 1964 W. G. MORING, JR., ETAL 3,141,516
CONVEYOR WEIGHING SCALE
Filed Aug. 31, 1960 3 Sheets-Sheet 2
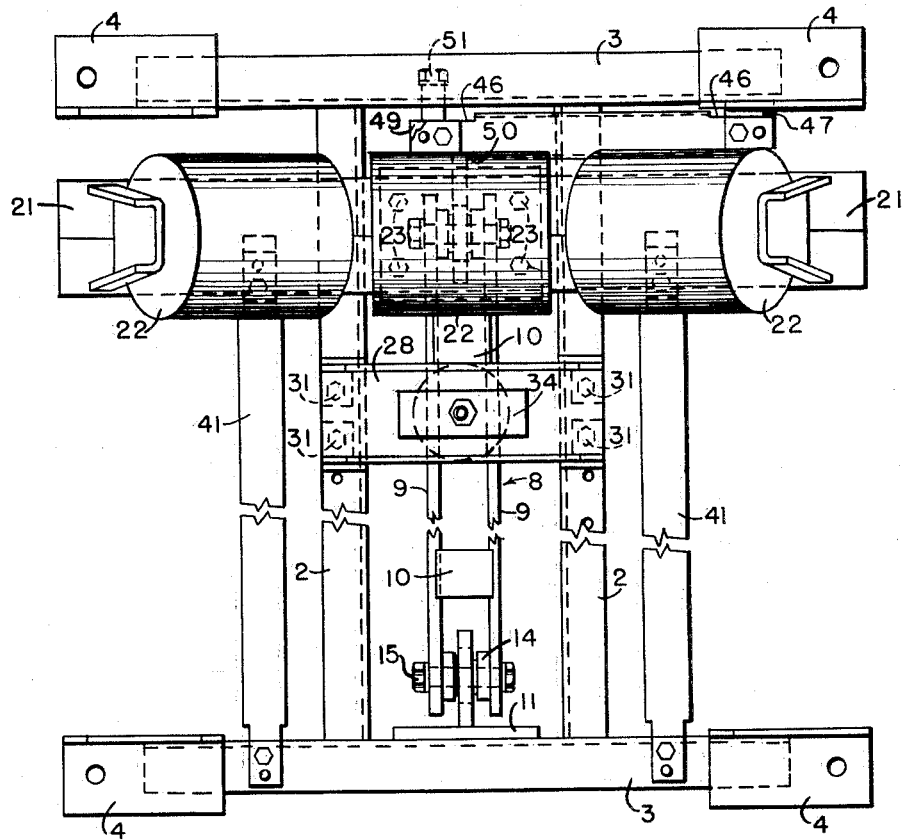
Fig. II
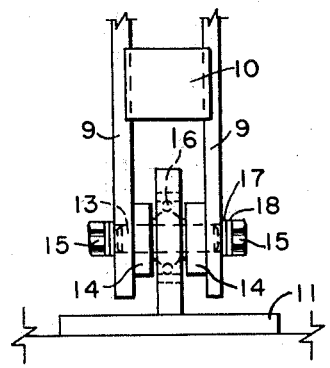
Fig. IV
INVENTORS
WALTER G. MORING JR.
FRED H. WEIHS
BY
Marshall & Wilson
ATTORNEYS

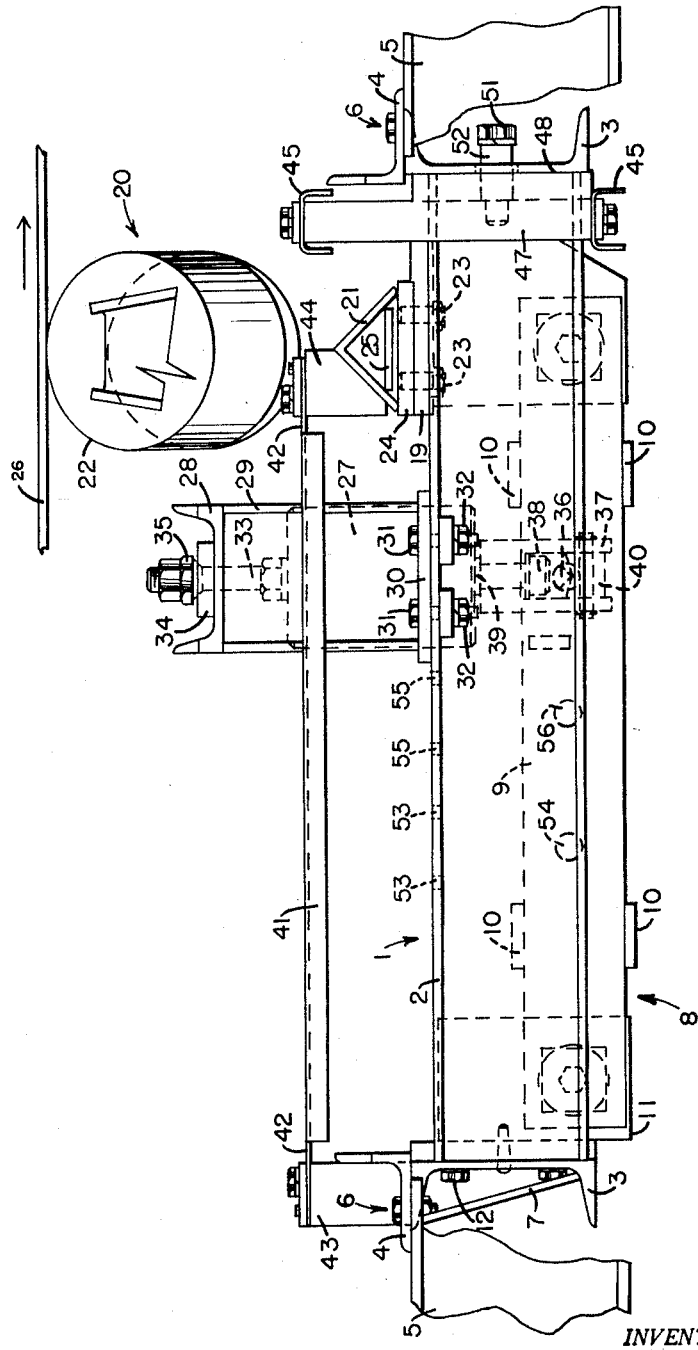

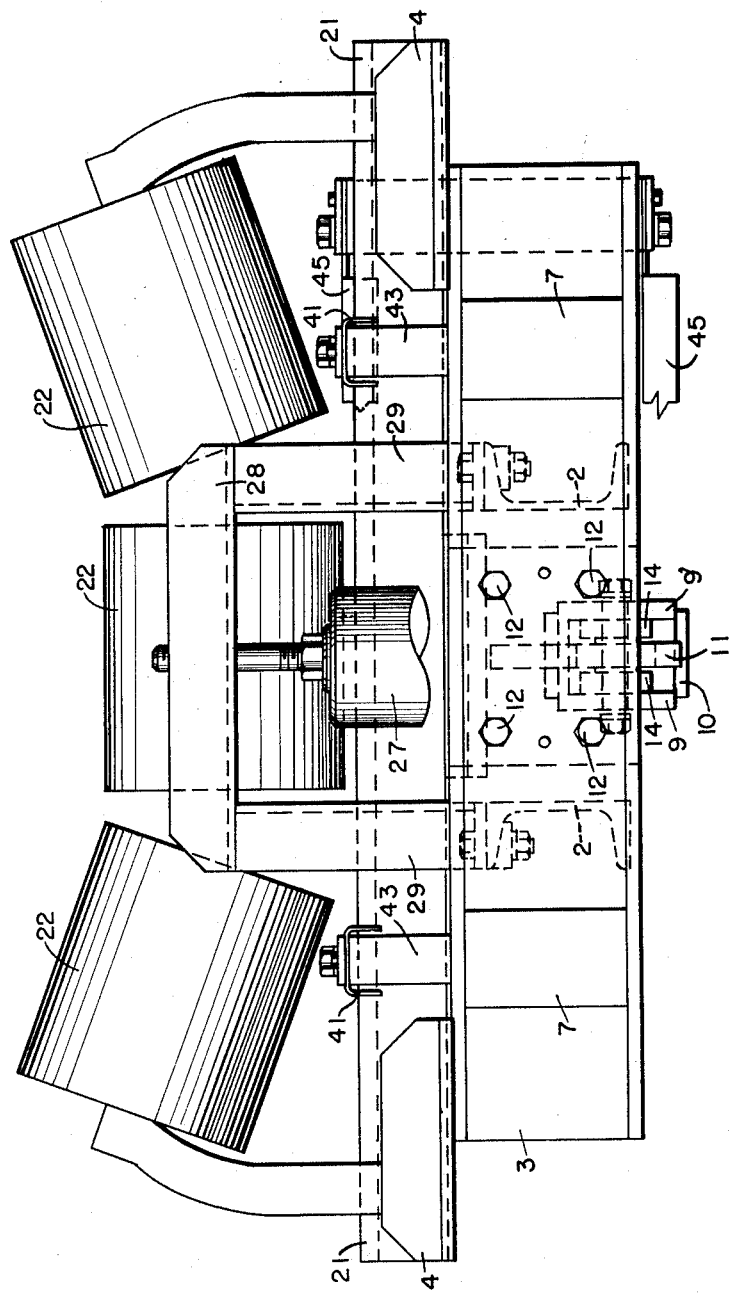

United States Patent Office 3,141,516
Patented July 21, 1964

3,141,516
CONVEYOR WEIGHING SCALE
Walter G. Moring, Jr., Oregon, and Fred H. Weihs, Toledo, Ohio, assignors to Toledo Scale Corporation, Toledo, Ohio, a corporation of Ohio
Filed Aug. 31, 1960, Ser. No. 53,124
7 Claims. (Cl. 177—246)

This invention relates generally to conveyor weighing scales.

The principal object of this invention is to improve conveyor weighing scales.

Another object of this invention is the provision of an integrating conveyor scale of simplified structure for ease of installation and service and of low cost construction.

A further object is to increase the precision of conveyor weighing scales.

Still another object is to provide a conveyor weighing scale having a pivotally mounted lever carrying a belt-carrying idler roller assembly with novel longitudinal and transverse flexure check structures to stabilize the lever and the parts carried thereby.

A further object is the provision of a conveyor scale having a capacity which can be varied easily without the substitution of any part and without any deleterious effect on weighing accuracy.

One embodiment of this invention enabling the realization of these objects is a conveyor weighing scale having an under-the-belt weigh frame of simple yet strong and rigid construction. A lever carrying a belt-carrying idler roller assembly is pivoted on the frame and pulls down on a weight sensing means in the form of a strain gage load cell mounted on the frame. Flexure check link means are connected to the frame and to the lever for restraining the lever from longitudinal and transverse rocking movements.

In accordance with the above, one feature of this invention resides in novel longitudinal and transverse flexure check structures to stabilize the lever and the parts carried thereby. The combination lever and flexure check structure increases the precision of the conveyor weighing scale by keeping friction to a minimum while restraining the lever from longitudinal and transverse rocking movements.

Another feature resides in providing adjustment of the positions of the strain gage load cell and its operative connection to the lever along the lever, whereby the capacity of the conveyor weighing scale is varied easily without the substitution of any part and without any deleterious effect on weighing accuracy. This is in contrast to prior conveyor weighing scales which require the substitution of load cells to vary capacities. In such prior scales, it often happens that the capacities of the available load cells do not match the required capacities.

The above and other objects and features of this invention will be appreciated more fully from the following detailed description when read with reference to the accompanying drawings wherein:

FIG. I is a side elevational view of an integrating conveyor weighing scale according to this invention;

FIG. II is a plan view of the weighing scale shown in FIG. I;

FIG. III is an end elevational view of the weighing scale shown in FIG. I; and

FIG. IV is an enlarged fragmentary view of a part of the weighing scale as shown in FIG. II.

Referring to the drawings, the integrating conveyor weighing scale includes an under-the-belt weigh frame 1 comprising a pair of spaced longitudinally extending channels 2 and a pair of transversely extending channels 3 welded together to form a rigid framework. Four mounting pads 4 are secured to the transverse channels 3 one at each corner of the frame and function as means for attaching the frame to conveyor stringers 5 which may be conveyor stringers already existing in the field. Bolts and nuts 6 secure the mounting pads 4 to the stringers 5. Plates 7 function to stiffen the left hand one of the transverse channels 3 as viewed in FIG. I.

A lever 8 formed from a pair of spaced longitudinally extending plates 9 connected together by means of four relatively small plates 10 is fulcrumed on a recumbent T-shaped member 11 fixed, by means of four screws 12, to the frame 1 near the left hand end of the frame as viewed in FIG. I. A pivot shaft 13 (FIG. IV) is received in an opening in the T-shaped member 11 and in corresponding openings in the lever 8 to pivotally mount the lever, the pivot shaft 13 being slightly shorter than the overall width of the lever 8 as shown in FIG. II. Such openings in the lever 8 extend through pads 14 secured to the inner surfaces of the lever plates 9. Screws 15 one in each end of the pivot shaft 13 squeeze the lever pads 14 against the inner race of a ball bearing 16 in the T-shaped member 11, which receives the pivot shaft 13, preventing any sideways play in the lever but allowing the lever to be freely pivotable about the axis of the pivot shaft 13. A flat washer 17 and a lock washer 18 are interposed between the outer surfaces of the lever 8 and each of the heads of the screws 15.

The lever 8 carries an erect T-shaped member 19 which is pivotally mounted on the lever in the same manner as the lever is pivotally mounted on the recumbent T-shaped member 11. Hence, the description of the ball bearing mounting for the T-shaped member 19 is not repeated herein. A conventional idler roller assembly 20 comprising a transversely extending angle 21 and three rollers 22 carried thereby is secured atop the erect T-shaped member 19 by means of four screws 23 which extend through the top of such T-shaped member and which are threaded into a plate 24 secured to the bottom of the angle 21, a bar 25 being fixed inside the angle 21 as a reinforcement. The weigh idlers are perpendicular to the plane of a lead carrying conveyor belt 26 carried by the weigh idlers and are in line with adjacent idlers carried by the conveyor stringers 5 which adjacent idlers are not shown since they are of conventional construction. The belt 26 moves in the direction indicated by the arrow in FIG. I. This pivotally mounts the weigh idler roller assembly 20 on the lever 8.

The frame 1 also supports a weight sensing means 27 in the form of a strain gage load cell. Any other suitable weight sensing transducer, such as a linear differential transformer, can be used in place of the load cell 27. The load cell 27 is hung from a horizontal channel 28 supported at each of its ends by channel legs 29 each having a foot 30 attached by means of two bolts 31 and two nuts 32 to the corresponding one of the longitudinal frame channels 2. The load cell 27 is hung from the horizontal channel 28 by means of a rod 33 secured to the upper end of the load cell and extending through openings in the horizontal channel 28 and in a plate 34 atop such channel, a cone-nut 35 on the rod 33 being received in a depression in such plate 34 to provide for self alignment of the load cell 27. This suspends the load cell 27 directly above a knife-edge pivot 36 which is carried by the lever 8 and which extends between the longitudinal lever plates 9. An inverted U-shaped clevis 37 is rigidly fixed, by means of a cap screw 38, to the load button 39 of the load cell 27 and carries a bearing 40 between its legs which receives the knife-edge pivot 36, the clevis 37 and its bearing 40 being located between the longitudinal lever plates 9. This operatively connects the load cell 27 to the lever 8.

The idler roller assembly 20 and the portion of the conveyor belt 26 passing thereover constitute a weighing platform. The weight of commodities passing over the rollers 22 tends to pivot the lever 8 in a clockwise direction about the axis of the pivot shaft 13, as viewed in FIG. I, subjecting the strain gage load cell 27 to a tension load, the load cell generating an electrical signal that is proportional to the weight of the instantaneous load applied to the rollers 22. This electrical signal is applied to apparatus, including integrating mechanism which relates conveyor belt load with speed for a continuous running total of load carried, that indicates the total weight of material transported by the belt 26 during a period of time, which apparatus is not shown but which is disclosed in U.S. Patent No. 2,918,269 issued December 22, 1959 to Roger B. Williams, Jr.

One feature of the invention resides in longitudinal and transverse flexure check structure to stabilize the lever 8 and the parts carried thereby. The combination lever and flexure check structure increases the precision of the conveyor weighing scale by keeping friction to a minimum while restraining the lever from longitudinal and transverse rocking movements. The flexure check structure ensures a concentric pull on the load cell 27 even though the conveyor belt 26 is eccentrically loaded.

The longitudinal flexure check structure comprises a pair of flexure check links 41 each formed from a channel having longitudinal extensions 42. The left hand extensions 42 as viewed in FIG. I are attached to blocks 43 atop the left hand one of the transverse channels 3 of the frame 1 and the right hand extensions 42 are attached to blocks 44 atop the angle 21 of the roller assembly 20. As viewed from either side of the weighing scale, the flexure check links form the upper side of a parallelogram. With reference to FIG. I, lines drawn from the effective bending areas of the extensions 42 to the axes of the roller bearing mounted shafts form two sides of parallelogram, a line drawn between such bending areas forms the top of the parallelogram, and a line drawn between such axes forms the bottom of the parallelogram.

The transverse flexure check structure comprises a pair of flexure check links 45 each formed from a channel having longitudinal extensions 46. The right hand extensions 46 as viewed in FIG. II are attached one to the top and one to the bottom of a block 47 welded at 48 (FIG. I) to the transverse frame channel 3 and the left hand extensions 46 as viewed in FIG. II are attached one to the top and one to the bottom of a block 49 (FIG. II) welded at 50 (FIG. II) to the erect T-shaped member 19. The flexure check links 45 form the top and bottom of a parallelogram, the sides of such parallelogram being formed by imaginary lines connecting the upper effective bending areas of the extensions 46 to the corresponding lower effective bending areas of the extensions 46. A horizontal screw 51, carrying a spacer 52, carried by the block 49 extends through an oversize opening in the transverse frame channel 3. Contact of the spacer 52 on the screw 51 with the transverse frame channel 3 prevents overloading of the load cell 27.

Another feature resides in providing adjustment of the positions of the load cell and its operative connection to the lever along the lever, whereby the capacity of the conveyor weighing scale is varied easily without the substitution of any part and without any deleterious effect on weighing accuracy. This is in contrast to prior weighing scales which require the substitution of load cells to vary capacities. In such prior scales, it often happens that the capacities of the available load cells do not match the required capacities. Conveyor weighing scales of the invention are constructed each from like parts and then each is adapted to the particular capacity required by the user in the field. This adaptation to the required capacity is accomplished by so selecting the correct size load cell and by so selecting the location of the load cell and its operative connection to the lever along the lever that the load cell is used in the upper part of its capacity range. The capacity of the conveyor weighing scale shown in FIGS. I–III is varied by removing the nuts 32 from the bolts 31 and the pivot 36 from the level 8 and then moving the channel 28 and its legs 29 carrying the load cell 27 to another location along the frame 1 and replacing the pivot 36 in a corresponding location in the lever 8. For example, the load cell 27 can be moved to a location wherein the bolts 31 are insertable in holes 53 in the longitudinal frame channels 2. In such position, the pivot 36 is received in holes 54 in the lever 8. The nuts 32 then are tightened on the bolts 31 and the pivot 36 received in the bearing 40 and the weighing scale is ready for operation. This is an exceedingly simple way to vary the capacity and at the same time not affect the accuracy of weighing. This feature has additional value in that the capacities of many weighing scales in the field can be changed to meet changed demands without the need for changing the load cells which are of relatively high cost. As another example, the load cell 27 can be moved to a location wherein the bolts 31 are insertable in holes 55 in the longitudinal frame channels 2. In such position, the pivot 36 is received in corresponding holes 56 in the lever 8. The selection of the load cell of correct size for each particular job may be considered as a rough adjustment and positioning the load cell along the lever may be considered as a fine adjustment. This ensures that the load cell is used in the upper part of its capacity range to increase the precision of conveyor weighing scales.

It is to be understood that the above description is illustrative of this invention and that various modifications thereof can be utilized without departing from its spirit and scope.

Having described the invention, we claim:

1. In a conveyor weighing scale having a roller assembly, in combination, a frame including a plurality of transverse members and a plurality of longitudinal members, pivot means carried by one of said transverse members, flexure check link mounting means carried by a pair of said transverse members, a longitudinally extending lever pivotally mounted by the pivot means centrally of a pair of said longitudinal members, weight sensing means, support means carried by and spanning said pair of longitudinal members for supporting the weight sensing means, means operatively connecting the lever to the weight sensing means, and pairs of longitudinal and transverse flexure check links connected to the mounting means and operatively connected to the lever.

2. In a conveyor weighing scale having a roller assembly, in combination, a frame, a lever pivotally mounted on the frame and carrying the roller assembly, weight sensing means, connecting means for operatively connecting the weight sensing means to the lever, the weight sensing means and the connecting means being readily movable from one location to another for varying the capacity of the weighing scale, and means operatively connected to the frame and to the lever for restraining the lever from longitudinal and transverse rocking movements.

3. In a conveyor weighing scale having a roller assembly, in combination, a frame, a lever including a pair of spaced longitudinal members pivotally mounted on the frame and carrying the roller assembly, weight sensing means, connecting means depending from the weight sensing means between the spaced lever members for operatively connecting the weight sensing means to the lever, the weight sensing means and the connecting means being readily movable from one location to another for varying the capacity of the weighing scale, and means operatively connected to the frame and to the lever for restraining the lever from longitudinal and transverse rocking movements.

4. In a conveyor weighing scale having a roller assembly, in combination, a frame including a plurality of transverse members and a plurality of longitudinal members, pivot means carried by one of said transverse members, a lever pivotally mounted by the pivot means, weight sensing means carried by the longitudinal members and operatively connected to the lever, the weight sensing means being readily movable along the longitudinal members for varying the capacity of the weighing scale, and stabilizing means operatively connected to the frame and to the lever for ensuring concentric loading of the weight sensing means.

5. In a conveyor weighing scale having a roller assembly, in combination, a frame including a plurality of transverse members and a plurality of longitudinal members, pivot means carried by one of said transverse members, a lever pivotally mounted by the pivot means centrally of a pair of said longitudinal members, weight sensing means, support means carried by and spanning said pair of longitudinal members for supporting the weight sensing means, connecting means operatively connecting the lever to the weight sensing means, the support means and the connecting means being readily movable along the pair of longitudinal members for varying the capacity of the weighing scale, and stabilizing means operatively connected to the frame and to the lever.

6. In a conveyor weighing scale having a roller assembly, in combination, a frame including a plurality of transverse members and a plurality of longitudinal members, pivot means carried by one of said transverse members, flexure check link mounting means carried by a pair of said transverse members, a lever pivotally mounted by the pivot means centrally of a pair of said longitudinal members, weight sensing means, support means carried by and spanning said pair of longitudinal members for supporting the weight sensing means, connecting means operatively connecting the lever to the weight sensing means, the support means and the connecting means being located in one of a plurality of load capacity positions along the pair of longitudinal members, and pairs of longitudinal and transverse flexure check links connected to the mounting means and operatively connected to the lever.

7. In a conveyor weighing scale, in combination, a frame including a plurality of transverse members and a plurality of longitudinal members, pivot means carried by the frame, flexure check link mounting means carried by the frame, a longitudinally extending lever pivotally mounted by the pivot means between a pair of said longitudinal members, weight sensing means, support means carried by and spanning said pair of longitudinal members for supporting the weight sensing means, means operatively connecting the lever to the weight sensing means, and longitudinal and transverse flexure check link means connected to the mounting means and operatively connected to the lever.

References Cited in the file of this patent

UNITED STATES PATENTS

| | | |
|---|---|---|
| 1,018,068 | Merrick | Feb. 20, 1912 |
| 2,664,286 | Frazel | Dec. 24, 1953 |
| 2,802,660 | Williams | Aug. 13, 1957 |
| 2,882,036 | Lyons | Apr. 14, 1959 |
| 2,885,198 | Roessler | May 5, 1959 |
| 2,901,235 | Bradley | Aug. 25, 1959 |
| 2,954,969 | McCullough et al. | Oct. 4, 1960 |